United States Patent [19]
Edson

[11] Patent Number: 4,830,583
[45] Date of Patent: May 16, 1989

[54] FLUID MOTOR-PUMPING APPARATUS AND SYSTEM

[75] Inventor: William A. Edson, Los Altos Hills, Calif.

[73] Assignee: SRI International, Menlo Park, Calif.

[21] Appl. No.: 163,801

[22] Filed: Mar. 2, 1988

[51] Int. Cl.⁴ .............................................. F04B 9/08
[52] U.S. Cl. .............................. 417/318; 91/350/352; 417/393
[58] Field of Search ............... 417/318, 349, 404, 393, 417/397, 403, 401; 91/350, 352, 324

[56] References Cited

U.S. PATENT DOCUMENTS

| | | | |
|---|---|---|---|
| 421,159 | 2/1890 | Brown | 417/318 |
| 1,516,894 | 11/1924 | Stevenson | 91/350 X |
| 2,283,313 | 5/1942 | Brockson | 91/324 |
| 2,349,150 | 5/1944 | Falasconi | 417/318 |
| 2,486,495 | 11/1949 | Rider | 417/318 X |
| 2,816,822 | 12/1957 | Hess | 23/273 |
| 2,861,519 | 11/1958 | Houle | 417/397 X |
| 3,234,746 | 2/1966 | Cope | 62/55 |
| 3,349,995 | 10/1967 | Sheesley | 230/52 |
| 3,530,873 | 9/1970 | Arp | 137/99 |
| 3,649,136 | 3/1972 | Ruidisch | 417/404 |
| 3,700,360 | 10/1972 | Shaddock | 417/404 |
| 3,825,122 | 7/1974 | Taylor | 210/134 |
| 4,367,140 | 1/1983 | Wilson | 210/110 |
| 4,637,783 | 1/1987 | Andeen | 417/318 |
| 4,684,332 | 8/1987 | Hartlley | 417/397 |
| 4,780,064 | 10/1988 | Olsen | 417/397 |

FOREIGN PATENT DOCUMENTS

785597  8/1935  France ........................ 417/393
1176531  1/1970  United Kingdom .

*Primary Examiner*—Leonard E. Smith
*Attorney, Agent, or Firm*—Victor R. Beckman

[57] ABSTRACT

A fluid pump is shown which includes integral valve and cylinder housings. The cylinder housing is formed with axially aligned cylinders. Axially movable pistons are located in the cylinders, which pistons are interconnected by a piston rod extending through a common inner end wall of the cylinders. Axially movable push rods extend through opposite outer end walls of the cylinders. The valve housing contains a plurality of three-way valves for communication with opposite ends of the cylinders, which valves are interconnected for simultaneous movement thereof. Mechanical linkage connects the push rods to the valves for actuation of the valves from a first to a second condition when the pistons are moved to one end of the cylinders, and for actuation from the second to the first condition when the pistons are moved to the other end of the cylinders. Resilient rocker arms are included in the mechanical linkage for storing and returning kinetic energy of the movable pistons at opposite ends of piston travel. End covers at opposite ends of the valve and cylinder housings prevent external leakage of fluid which may leak from opposite ends of the valve housing or from the cylinders past the push rods.

20 Claims, 4 Drawing Sheets

FLUID MOTOR-PUMPING APPARATUS AND SYSTEM

TECHNICAL FIELD

This invention relates to a fluid motor-pumping apparatus and system of the type which includes a pair of axially aligned cylinders and interconnected pistons, and to a valving arrangement for the motor-pump.

BACKGROUND OF THE INVENTION

Fluid motor-pumping means which include a pair of axially aligned cylinders add interconnected pistons therein are well known as shown, for example, in U.S. Pat. Nos. 4,637,783, issued Jan. 20, 1987; 3,649,136, issued Mar. 14 1972; 3,540,873, issued Sept. 29, 1970; 421,159, issued Feb. 11, 1890; 3,234,746, issued Feb. 15, 1966; 3,825,122, issued July 23, 1974; 3,700,360, issued Oct. 24, 1972; 4,367,140, issued Jan. 4, 1983; 3,349,995, issued Oct. 31, 1967; and 2,816,822, issued Dec. 17, 1957. A similar fluid motor-pumping means is shown in United Kingdom patent No. 1,176,531 published Jan. 7, 1980. In many of the above-identified systems, the valving arrangement for control of fluid to and from the motor-pumping means is located separately from the cylinders and is subject to loss of fluid in the event of leakage past the valves. Also, many of the arrangements have no provision for storing and returning kinetic energy of the pistons and/or means for minimizing the harmful effects of water hammer.

SUMMARY OF THE INVENTION AND OBJECTS

An object of this invention is the provision of improved means for pumping fluids which includes efficient valving means which comprise an integral part of motor-pumping means.

An object of this invention is the provision of an improved valving arrangement for motor-pump means which avoids external loss of fluid if leakage occurs therein.

An object of this invention is the provision of an improved valving arrangement for use in a motor-pump system which minimizes the harmful effects of water hammer.

An object of this invention is the provision of an improved valving arrangement of the above-mentioned type for use in a motor-pump system, which valving arrangement conserves energy and cushions reciprocating motion of the motor-pump pistons by storing and returning kinetic energy of the moving pistons.

The above and other objects and advantages of this invention are achieved by a motor-pump system which includes a pair of axially aligned cylinders with a piston in each cylinder. The pistons are interconnected by a connecting rod extending through a common inner piston wall. A valve housing is affixed to the axially aligned cylinders and extends for the length of the cylinders and parallel therewith. First, second, third and fourth movable three-way valve means are located inside said valve housing which valve means are interconnected for simultaneous operation between first and second conditions.

Axially movable push rods extend through the cylinder end walls, which push rods are engagable by the pistons for axial movement outwardly from the cylinders by the pistons when the push rods are engaged by the pistons during reciprocal piston movement. Linkage means at opposite ends of the cylinders connect the push rods to the interconnected three-way valve means for simultaneous valve actuation when the pistons are adjacent the opposite ends of travel. Each linkage includes an elastic member to cushion the reciprocating motion of the pistons, which elastic members may comprise resilient rocker arms which cushion piston motion by bending. First and second end covers at the outer ends of the cylinders provide fluid tight chambers for the linkage means whereby leakage past the three way valves or linkage means is contained such that external fluid leakage is prevented. As is well understood, it is much easier to establish and maintain a fluid-tight seal between relatively fixed members, such as the end covers and cylinder ends, than between relatively movable members, such as the movable valves and valve housing, and the axially movable push rods and cylinder end walls. With the present invention, some fluid leakage past relatively movable parts may be tolerated without substantially compromising efficiency of operation of the apparatus, and without external fluid leakage therefrom.

BRIEF DESCRIPTION OF THE DRAWINGS

The invention, together with other objects and advantages thereof, will be better understood from the following description considered with the accompanying drawings. In the drawings, wherein like reference characters refer to the same parts in the several views.

Figure 1:
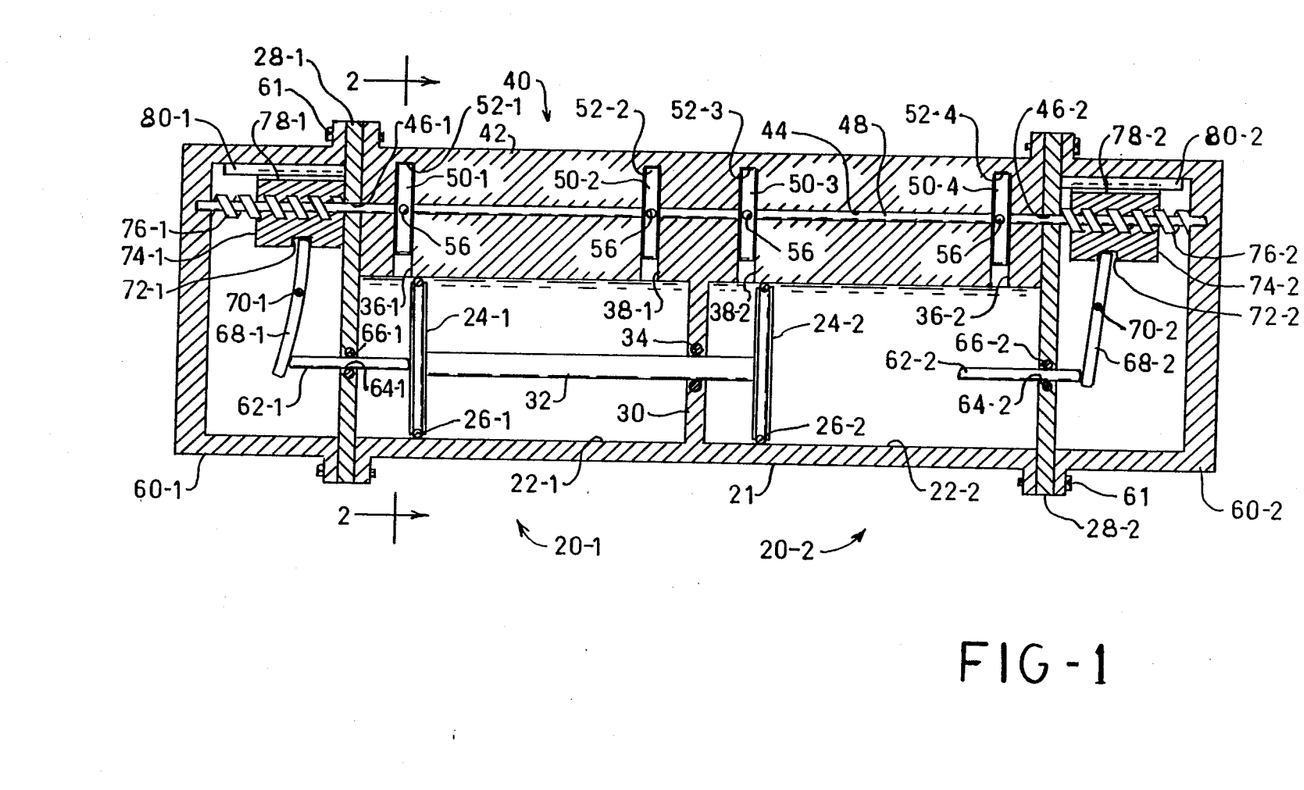
FIG. 1 is a longitudinal cross-sectional view of an embodiment of the fluid motor-pumping means of this invention with some parts being shown in elevation.

Reference first is made to FIG. 1 wherein one embodiment of a fluid pumping system of the present invention is shown comprising a pair of interconnected fluid motor-pump devices 20-1 and 20-2. They include cylinder housing means 21 formed with first and second closed cylinders 22-1 and 22-2 containing reciprocable pistons 24-1 and 24-2. Seal rings 26-1 and 26-2 provide a substantially fluid-tight engagement between the pistons and associated cylinder walls while allowing for sliding movement of the pistons in the cylinders. First end walls 28-1 and 28-2 close the outer ends of cylinders 22-1 and 22-2. The cylinders are axially aligned and integrally formed, and are provided with a unitary inner end wall 30 at the inner ends thereof. Pistons 24-1 and 24-2 are interconnected by a connecting rod 32 for simultaneous movement thereof, which rod extends through an aperture in the inner wall 30. A small diameter seal ring 34 at the wall aperture provides a sealing engagement between the rod and wall while allowing for axial movement of the rod therewith.

Cylinders 22-1 and 22-2 are provided with inlet-outlet ports adjacent opposite ends thereof for inflow and outflow of an operating fluid at the outer end of the cylinders, and for inflow and outflow of a fluid to be pumped at the inner end of the cylinders. As used herein, the inner end of the cylinder refers to the end of the cylinder extending in the same direction as the associated piston rod. In the drawing, the unitary end wall 30 is located at the inner ends of the cylinders, and the first end walls 28-1 and 28-2 are located at the outer ends thereof. Inlet-outlet ports 36-1 and 36-2 for operating fluid are provided adjacent the outer ends of cylinders 22-1 and 22-2, respectively, and inlet-outlet ports 38-1 and 38-2 for fluids to be pumped are provided adjacent the inner ends of the respective cylinders 22-1 and 22-2.

Valve means identified generally by reference numeral 40 are located adjacent the cylinder inlet-outlet ports for control of fluid into and from the cylinders through said ports. Valve means 40 includes valve housing 42 integral with cylinder housing means 21 and extending for the entire length thereof between end walls 28-1 and 28-2. A longitudinally extending bore 44 is formed through the valve housing 42, and apertures 46-1 and 46-2 in axial alignment with bore 44 are formed in end walls 28-1 and 28-2, respectively. A rotatable valve actuating rod 48 extends through the bore 44 and apertures 46-1 and 46-2, to which rod four valve members 50-1, 50-2, 50-3 and 50-4 are attached for simultaneous rotation upon rotation of actuating rod 48.

Figure 2:
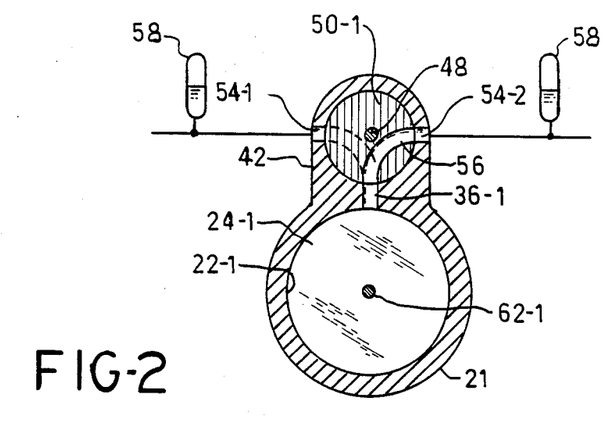
FIG. 2 is a cross-sectional view taken along line 2—2 of FIG. 1.

Valve members 50-1 through 50-4 are of a cylindrical shape and are adapted for rotation in cylindrical cavities 52-1 through 52-4, respectively, in the valve housing. Seal means such as O-rings, not shown, may be included between the valve members and housing to provide a substantially fluid-tight engagement therebetween. As seen in FIG. 2, ports 54-1 and 54-2 are formed in opposite walls of valve housing 42 for communicating with passage 56 in valve member 50-1. In the illustrated full line position of valve member 50-1, passage 56 provides communication between ports 36-1 and 54-2, and in the broken line position, wherein valve member 50-1 is rotated clockwise 90° from the illustrated full line position, passage 56 provides communication between ports 36-1 and 54-1. The other valve members 52-2 through 52-4 are provided with similar passages 56 and the valve housing is provided with ports similar to ports 54-1 and 54-2 for cooperation with the passages to provide for a plurality of similar three-way valves. In many applications for the fluid-motor, air chambers for cushioning the shock of rapid pressure changes in the line are provided adjacent the inlet-outlet ports, and in FIG. 2, two such chambers 58 are shown in communication with conduits from ports 54-1 and 54-2.

End covers 60-1 and 60-2 are attached as by machine screws 61 to the end walls 28-1 and 28-2 at opposite ends of the cylinders to provide fluid-tight enclosed chambers thereat for valve operating mechanism which links the three way valves to the pistons for operation of the valves upon movement of the pistons to the outer ends of the cylinders. Fixed seal means such as gaskets, not shown, may be included between the end walls and end covers to provide for a fluid-tight seal therebetween. Similarly, fixed gaskets may be provided between the end walls and valve and cylinder housings for fluid-tight engagement therebetween. The valve operating mechanism includes push rods 62-1 and 62-2 which extend through apertures 64-1 and 64-2 in the cylinder end walls 28-1 and 28-2, respectively. Resilient seal rings 66-1 and 66-2 at the apertures 64-1 and 64-2 provide for sealing engagement between the push rods and end walls while allowing for axial movement of the push rods. The push rods 62-1 and 62-2 are engagable by the outer ends of pistons 24-1 and 24-2 for movement of the push rods in an outwardly direction from the cylinders, and are engagable by levers, or rocker arms 68-1 and 68-2 for movement of the push rods inwardly of the cylinders.

Levers 68-1 and 68-2 are attached to pivot pins 70-1 and 70-2 which extend across the chambers between opposite side walls of the end covers 60-1 and 60-2. As noted above, one end of each lever 68-1 and 68-2 engages one of the push rods 62-1 and 62-2. The other ends of levers 68-1 and 68-2 engage recesses 72-1 and 72-2 formed in internally threaded blocks 74-1 and 74-2. External threads 76-1 and 76-2 are formed adjacent the outer ends of the rotatable valve actuating rod 48 for engagement with the female threads of the internally threaded blocks 74-1 and 74-2. Valve actuating rod 48 may be rotatably supported at the outer free ends thereof in recesses formed in the end covers 60-1 and 60-2, as illustrated. Blocks 74-1 and 74-2 are formed with longitudinal grooves 78-1 and 78-2 that are engaged by spines 80-1 and 80-2 formed on the covers 60-1 and 60-2 which allows for longitudinal block movement while preventing rotary movement thereof.

In the operation of the motor-pump, when the pistons are moved to the left, as viewed in FIG. 1, push rod 62-1 is engaged by piston 24-1 for movement of the push rod outwardly from the cylinder end wall 28-1 and into engagement with lever 68-1. Lever 68-1 thereby is pivoted in a clockwise direction whereupon block 74-1 is moved to the right thereby rotating valve actuating rod 48 and attached valve members 90°. With the valve members rotated 90°, communication to the cylinders is changed from one to another of the three-way valve ports, such as ports 54-1 and 54-2 shown in FIG. 2. As viewed in FIG. 2, valve actuating rod 48 and valve member 50-1 are rotated counterclockwise 90° from the broken line position to the full line position of the valve member by movement of threaded block 74-1 to the right as viewed in FIG. 1.

Figure 5:
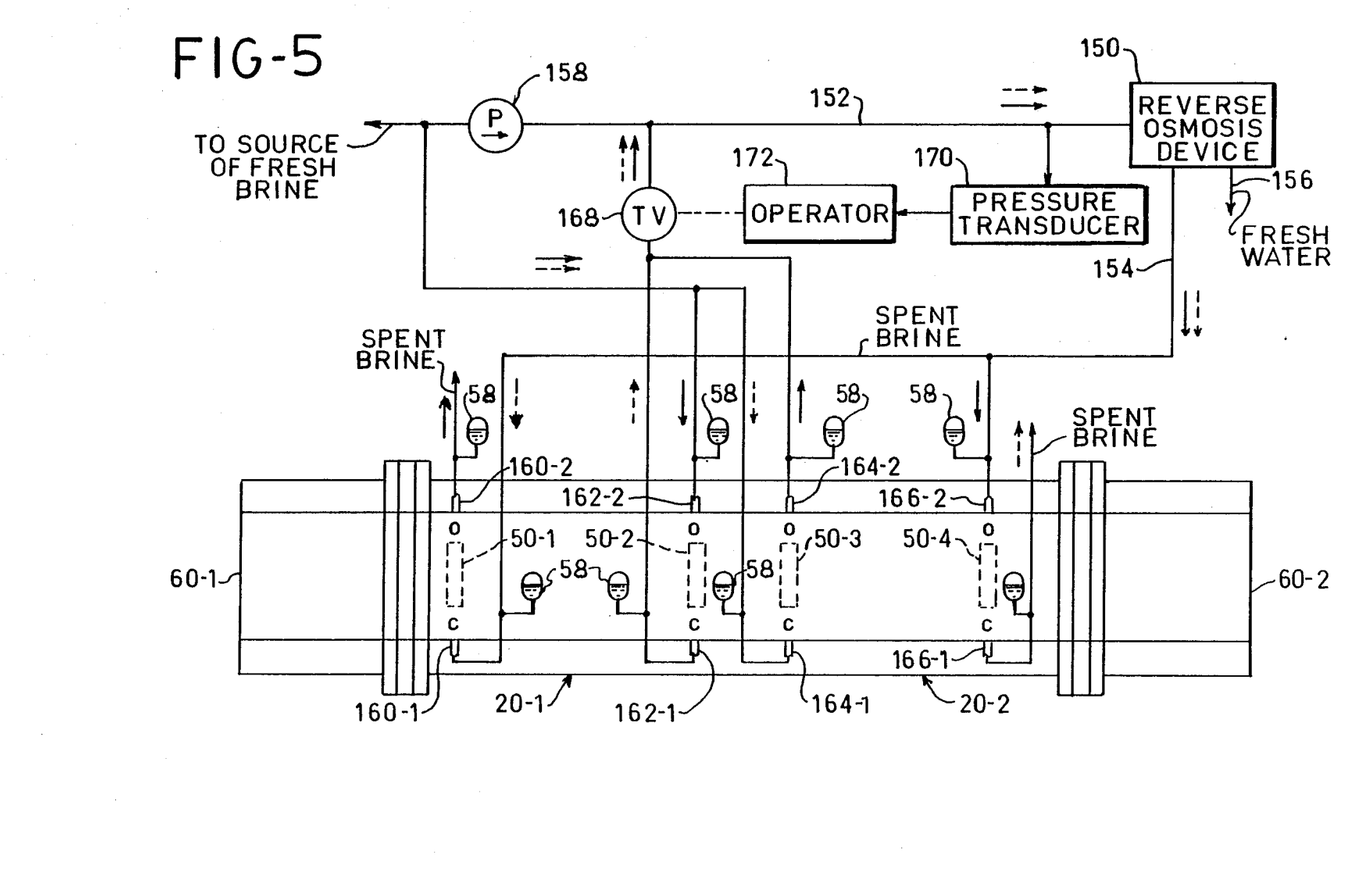
FIG. 5 is schematic diagram showing the motor-pump means of FIGS. 1 and 2 included in a reverse osmosis system for recovery of energy from spent brine discharged from a reverse osmosis device.

Upon rotation of rod 48 by axial movement of the block 74-1 to the right as viewed in FIG. 1, block 74-2 simultaneously is driven to the right by the rotating rod 48. Movement of block 74-2 to the right rotates lever 68-2 in a clockwise direction which, in turn, drives push rod 62-2 inwardly into cylinder 22-2. Upon rotation of the three way valves 50-1 through 50-4 from a first to a second condition (e.g. from the broken line to the full line condition shown in FIG. 2) interconnected pistons 24-1 and 24-2 are driven in the opposite direction (to the right in FIG. 1). Now, when piston 24-2 engages push rod 62-2, the rod is moved to the right which, in turn, pivots lever 68-2 in a counterclockwise direction to drive block 74-2 axially to the left. Valve actuating rod 48 and attached valve members 50-1 through 50-4 are thereby rotated back to the first condition whereupon the cycle of operation is repeated. For purposes of illustration, use of the motor-pump in a reverse osmosis system is shown in FIG. 5 of the drawings and described below.

In accordance with one feature of this invention, the linkage means for connecting the pistons 24-1 and 24-2 to the three-way valves 50-1 through 50-4 is provided with mechanical elasticity to cushion the reciprocating motion of the movable pistons. Such elasticity may be provided in several ways including, for example, the use of elastic lever arms 68-1 and 68-2. As seen in FIG. 1, when block 74-1 abuts end wall 28-1 at one end of travel thereof, force on lever arm 68-1 by push rod 62-1 produces a slight bend in the elastic lever arm. With substantially no stress on the lever arms the arms assume their normal shape, which may be straight. In FIG. 1, unstressed arm 68-2 is straight whereas stressed arm 68-1 is best. Such elasticity of lever arms 68-1 and 68-2 avoids harmful shock and adds to efficiency by storing and returning the kinetic energy associated with the mass and velocity of the moving pistons. The spring design is such as to not interfere with proper action of the valves.

During most of the piston travel, the pistons are out of contact with the associated push rods. A detent mechanism, not shown, may be included in the valve operating mechanism to ensure that the valves will snap quickly from one end position to the other, and to prevent inadvertent rotation of the valves during travel of the pistons between the push rods.

Figure 3:
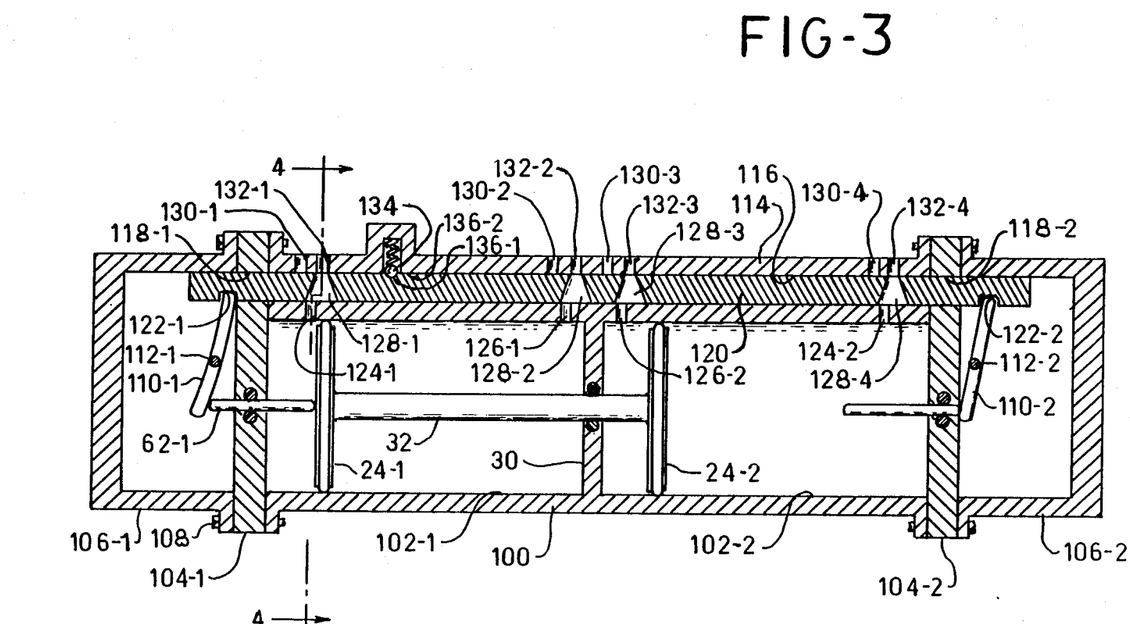
FIG. 3 is a longitudinal cross-sectional view which is similar to that of FIG. 1 but showing a modified form of this invention.
Figure 4:
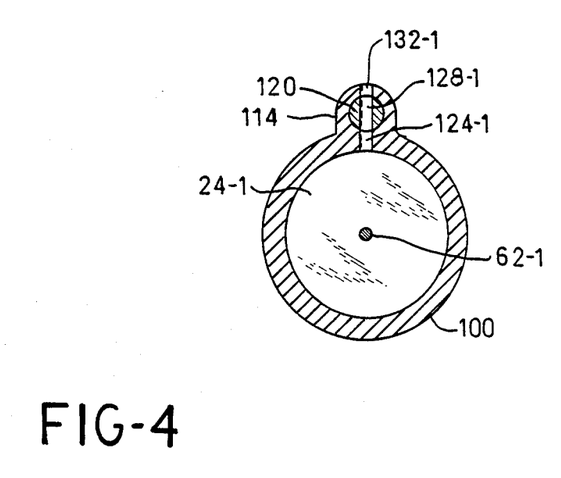
FIG. 4 is a cross-sectional view taken along line 4—4 of FIG. 3.

Reference now is made to FIGS. 3 and 4 wherein a modified form of this invention is shown which includes longitudinally rather than rotary movable valve means. As with the FIG. 1 and 2 embodiment, the fluid motor-pump device of FIGS. 3 and 4 includes cylinder housing means 100 formed with first and second closed cylinders 102-1 and 102-2 containing reciprocable pistons 24-1 and 24-2 interconnected by a connecting rod 32 which extends through an aperture in the inner end wall 30. The outer ends of the cylinders are closed by end walls 104-1 and 104-2 through which push rods 62-1 and 62-2 extend, as with the FIGS. 1 and 2 arrangement. End covers 106-1 and 106-2 are attached by machine screws 108 to the end walls 104-1 and 104-2 to provide fluid-tight chambers thereat.

Pivotally movable lever arms 110-1 and 110-2 are located inside the end covers, which arms are adapted for pivotal movement about the axes of pivot pins 112-1 and 112-2 extending between opposite side walls of the end covers. As with the FIG. 1 and 2 arrangement, lever arms 110-1 and 110-2 are resilient so as to bend when stressed by application of force of the piston applied thereto through an associated push rod when further rotation of the arm is prevented by engagement of the arm with the cylinder end wall. In FIG. 3, arm 110-1 is shown in a flexed condition and arm 110-2 is shown in an unflexed condition.

Valve housing means 114 is integrally formed with cylinder housing means 100 and extends along the side wall of the cylinders 102-1 and 102-2, which valve housing is formed with a longitudinally extending cylindrical bore 116. The end walls 104-1 and 104-2 are formed with apertures 118-1 and 118-2 in axial alignment with bore 116, and a cylindrical slide valve 120 is located within the bore 116 and apertures 118-1 and 118-2 The outer ends of the slide valve extend into the chambers formed by the end covers 106-1 and 106-2, and are formed with recesses 122-1 and 122-2 into which the upper ends of lever, or rocker, arms 112-1 and 112-2 extend.

Inlet-outlet ports 124-1 and 124-2 for operating fluid are provided adjacent the outer ends of cylinders 102-1 and 102-2, respectively, and inlet-outlet ports 126-1 and 126-2 for fluids to be pumped are provided adjacent the inner ends of the respective cylinders 126-1 and 126-2. Tapered fluid passages 128-1, 128-2, 128-3, and 128-4 are formed in the slide valve, the large ends of which passages are always in communication with ports 124-1, 126-1, 126-2, and 124-2, respectively. Pairs of ports 130-1 and 132-1, 130-2 and 132-2, 130-3 and 132-3, and 130-4 and 132-4 are formed in the walls of the valve housing for communicating with the small ends of the valve member passages 128-1 through 128-4. In the illustrated position of valve member 120 wherein the valve member is at one end position, the right-most position, valve member passages 128-1 through 128-4 are in communication with respective ports 132-1 through 132-4. Upon movement of pistons 24-1 and 24-2 to the end of travel to the right, valve member 120 is moved to the left thereby providing for communication between valve member passages 128-1 through 128-4 and ports 130-1 through 130-4, respectively. Releasable detent means comprising a spring-loaded ball 134 in the valve housing, and spaced recesses 136-1 and 136-2 in the slide valve 120, ensures that the slide valve will snap quickly between the opposite end positions. Also, seal means, not shown, may be included between the valve housing and valve member at appropriate locations therealong to provide for a substantially fluid-tight engagement therebetween.

Operation of the FIG. 3 and 4 embodiment is similar to that of the FIG. 1 and 2 embodiment. Briefly, when the pistons 24-1 and 24-2 are moved from the right end position to the left, as viewed in FIG. 3, push rod 62-1 is engaged by piston 24-1 for movement of the push rod outwardly from cylinder 102-1 and into engagement with lever 110-1 for clockwise pivotal movement of the lever. With clockwise movement of lever 110-1, slide valve 120 is moved to the right and snaps into the illustrated position by operation of the ball and socket detent means 134 and 136-1. Further movement of slide valve 120 to the right by pivotal level arm 110-1 is prevented when the upper end of arm 110-1 engages end wall 104-1. Further movement of push rod 62-1 to the left bends the elastic lever arm 110-1, as shown, to cushion motion of the pistons 24-1 and 24-2. Energy stored in the flexed lever arm is returned to the pistons to urge the same to the right.

During movement of slide valve 120 to the right, lever arm 110-2 is pivoted to the right, which pivotal movement drives push rod 62-2 inwardly of cylinder 102-2.

With slide valve 120 in the illustrated position, the interconnected pistons 24-1 and 24-2 are driven to the right, as viewed in FIG. 3, and, upon engagement of piston 24-2 with push rod 62-2, the push rod is moved to the right for counterclockwise pivotal movement of lever arm 110-2. Slide valve 120 is thereby moved to the left and snaps into the opposite end position by engagement of ball 134 with indentation 136-2.

With both embodiments, there is no external leakage of fluid from the pumping system even though leakage may occur past the valves or the valve actuating mechanism. Any such leakage past valves or elements of the valve operating mechanism simply involves flow of fluid from one part of the system to another, into or from the chambers provided by the end covers 60-1 and 60-2 (FIG. 1) or 106-1 and 106-2 (FIG. 3). Such an arrangement is of particular benefit when the pumping means is included in a high operating pressure system, such as a reverse osmosis system, where maintenance of fluid-tight seals is difficult. By containing the fluid, small leakage past relatively movable elements (such as the push rods and end walls) would result in only a small loss in efficiency of the motor-pump units. Furthermore, since the use of O-ring seals between relatively movable parts results in additional friction, the loss in efficiency due to leakage past such parts not provided with O-ring seals may be less than that caused by the friction. In such a case, the use of O-ring seals between the relatively movable parts may be eliminated.

Reference now is made to FIG. 5 wherein, for purposes of illustration only, a fluid pump of the type shown in FIGS. 1 and 2, is shown included in a reverse osmosis system for recovery of energy from spent brine discharged under high pressure from a reverse osmosis device. The energy recovery and reverse osmosis system, which may be of the same type as shown in the above-mentioned U.S. Pat. No. 4,637,783, includes a reverse osmosis device 150 having a fresh brine inlet 152, a spent brine outlet 154, and a fresh water outlet 156. Fresh brine from a source of pretreated seawater, not shown, is supplied to the inlet of the reverse osmosis device by means of a high pressure pump 158. Water passes through semipermeable membranes included in the reverse osmosis device 150 and is discharged from the fresh water outlet 156. Concentrated salt water is discharged from the spent brine outlet 154 at a lower pressure than the inlet pressure.

In FIG. 5, the three way valve members 50-1 through 50-4 are shown in phantom lines, and the letters C (for closed) and O(for open) are shown adjacent conduits associated with the valves. Operating fluid, in the form of spent brine from outlet 154 from reverse osmosis device 150 is supplied to the outer ends of cylinders 22-1 and 22-2 through conduits 160-1 and 166-2.

Spent brine is discharged from the cylinders through conduits 160-2 and 166-1. Fresh brine to be pumped to the reverse osmosis device 150 by the motor-pumps 20-1 and 20-2 is supplied to the inner ends of the cylinders 22-1 and 22-2 through conduits 162-2 and 164-1. Fresh brine is pumped from cylinders 22-1 and 22-2 through conduits 162-1 and 164-2, a throttle valve 168, and inlet conduit 152 to the reverse osmosis device 150. In the illustrated position of valve members 50-1 through 50-4, communication is provided between the motor-pump cylinders and conduits 160-2, 162-2, 164-2 and 166-2, whereas communication between the cylinders and conduits 160-1, 162-1, 164-1 and 166-1 is cut off.

Throttle valve 168 in the fresh brine discharge line from the motor-pump units 20-1 and 20-2 controls the system pressure. The fresh brine inlet pressure to the reverse osmosis device 150 is sensed by a pressure transducer 170 having a variable electrical output which is supplied to a valve operator 172 which, in turn, controls opening and closing of the throttle valve 168. Assuming use of a positive displacement primary pump 158, with an increase in pressure sensed by pressure transducer 170 the throttle valve 168 is further opened which allows the energy recovery device 150 to operate faster increasing the brine exit rate from the total system and reducing the system pressure. If desired, the throttle valve 168 may be located in the spent brine outlet conduit 154 for system pressure control.

In operation, fresh brine at low pressure is supplied to the high pressure primary pump 158 and to the pumping chamber of one or the other of the motor pump units 20-1 or 20-2, depending upon the position of the three-way valves. In the illustrated position of the three-way valves, fluid flow is in the direction of the full line arrows adjacent the conduits. When the three-way valves are simultaneously moved to their other operating positions, fluid flow is in the direction of the broken-line arrows.

In the illustrated position of the three-way valves, fresh brine is supplied to the inner chamber of the cylinder 22-1 through conduit 162-2 and three-way valve 50-2. Simultaneously, spent brine is pumped from the outer end of the first cylinder through three-way valve 50-1 and conduit 160-2. The pistons are driven by spent brine from the reverse osmosis device 150 supplied through conduits 154 and 166-2 and three-way valve 50-4 to the outer end of the second cylinder 22-2. Fresh brine at the inner end of the cylinder 22-2 is pumped through three-way valve 50-3, conduit 164-2, throttle valve 168 and conduit 152 to the inlet of the reverse osmosis device 150.

It will be apparent that the inner faces of the pistons have a smaller effective surface area than the outer faces due to attachment of the connecting rod means 32 thereto. With such differential effective surface area, fresh brine is discharged from the cylinders at a pressure greater than the pressure of spent brine motive fluid supplied thereto. There is, then, a pressure amplification related to the differential piston surface area. Obviously, some energy is required for discharging spent brine from the opposite cylinder. The low pressure source of fresh brine supplied to the opposite cylinder during recharging thereof acts to move the pistons in the same direction as the spent brine motive fluid thereby assisting in the fresh and spent brine pumping operations.

When the pistons reach the left-most limit of travel, three-way valves 50-1 through 50-4 are simultaneously moved to the second valve position through the above-described mechanical linkage including push rod 62-1, lever arm 68-1, threaded block 74-1 and cooperating threaded end 76-1 of valve actuating rod 48 shown in FIG. 1. In this valve condition, fluid flow to and from the cylinders is reversed whereby spent brine from the reverse osmosis device 150 now is supplied to the outer end of cylinder 22-1 through conduit 160-1 and three-way valve 50-1 to drive the interconnected pistons to the right; fresh brine from the cylinder 22-1 is pumped through three-way valve 50-2 and conduit 162-1 to the reverse osmosis device; fresh brine from the source thereof is supplied to the cylinder 22-2 through conduit 164-1 and three-way valve 50-3 to recharge the same; and spent brine is discharged from the cylinder 22-2 through conduit 166-1 and three-way valve 50-4. When the three-way valves are returned to the first position by movement of push rod 62-2 by piston 24-2, the energy recovery cycle is repeated.

It also will be apparent that sealing engagement between relatively immovable movable parts, such as the end covers and associated outer end walls, is much easier to secure and maintain than sealing engagement between relatively movable parts, such as the push rods and associated end walls. With the present invention, fluid is contained even if there is some small leakage between relatively movable components of the motor-pump system. Efficiency may or may not be compromised with such small leakage. If, for example, the O-ring seals result in additional friction to maintain fluid-tight engagement, then the loss of efficiency due to friction may be greater than the loss of efficiency which would occur with small leakage. It will be apparent, then, that with the present invention, small leakage between relatively movable parts may be tolerated without loss of efficiency and without loss of fluid from the system.

The invention having been described in accordance with requirements of the Pat. Statutes, various changes and modifications will suggest themselves the those skilled in this art. For example, the novel motor-pump means is not limited to use in a reverse osmosis system. In addition to use in other systems, use of the motor-pump device in a system wherein pumping fluid is supplied to the inner chambers of the cylinders and fluid to be pumped is supplied to the outer chambers also is contemplated. Also, other elements of the linkage means connecting the pistons to the three-way valves may be formed of resilient material to cushion the reciprocating piston movement. It is intended that the above and other such changes and modifications shall fall within the spirit and scope of the invention as defined in the appended claims.

I claim:

1. A fluid pumping apparatus comprising, cylinder housing means having first and second axially aligned cylinders formed therein, said cylinders having opposite inner and outer end wall means, first and second pistons axially movable in said respective first and second cylinders between inner and outer ends thereof, a piston rod extending through said inner end wall means and interconnecting the pistons for simultaneous movement thereof, valve housing means integral with said cylinder housing means and extending parallel therewith, a plurality of interconnected valve means inside said valve housing means for admission and discharge of fluid from opposite ends of said first and second cylinders, said valve means being simultaneously operable between first and second conditions, first and second mechanical linkage means engagable with said first and second pistons, respectively, and mechanically coupled to said interconnected valve means for moving said valve means from said first condition to said second condition upon movement of the first piston from the inner to the outer end of the first cylinder, and for moving said valve means from said second condition to said first condition upon movement of the second piston from the inner to the outer end of the second cylinder, and first and second cover means at the outer ends of said cylinders and opposite ends of said valve housing means for preventing external leakage of fluid which may leak from opposite ends of said valve housing means or from the outer end wall means of said first and second cylinders past said mechanical linkage means.

2. A fluid pumping apparatus as defined in claim 1 wherein said first and second mechanical linkage means comprise first and second push rods, respectively, extending through apertures in said outer end wall means in substantially fluid tight engagement therewith, and means including first and second rocker arms for connecting said respective first and second push rods to opposite ends of said interconnected valve means.

3. A fluid pumping apparatus as defined in claim 2 wherein said valve means are interconnected by a rotatable valve actuating rod extending through said valve housing means, which rod is threaded adjacent opposite ends thereof, said means for connecting said first and second push rods to opposite ends of said interconnected valve means including first and second non-rotatable, axially movable, blocks in engagement with said respective first and second rocker arms and threadedly engaging said threaded valve actuating rod for rotation of said valve actuating rod in one rotary direction upon axial movement of said first block by pivotal movement of said first rocker arm by said first push rod, and for rotation of said valve actuating rod in the opposite rotary direction upon axial movement of said second block by pivotal movement of said second rocker arm.

4. A fluid pumping apparatus as defined in claim 3 wherein said first and second rocker arms are resilient for storing and returning kinetic energy of said movable pistons at opposite ends of piston travel.

5. A fluid pumping apparatus as defined in claim 3 wherein said valve means comprise three-way valves.

6. A fluid pumping apparatus as defined in claim 2 wherein said interconnected valve means comprise axially movable slide valve means.

7. A fluid pumping apparatus as defined in claim 6 wherein said first rocker arm extends between said first push rod and the slide valve means adjacent one end thereof, and said second rocker arm extends between said second push rod and the valve operating means adjacent the opposite end thereof.

8. A fluid pumping apparatus as defined in claim 6 wherein said valve means comprise three-way valves.

9. A fluid pumping apparatus as defined in claim 6 wherein said first and second rocker arms are resilient for storing and returning kinetic energy of said movable pistons at opposite ends of piston travel.

10. A fluid pumping apparatus as defined in claim 2 wherein said first and second rocker arms are resilient for storing and returning kinetic energy of said movable pistons at opposite ends of piston travel.

11. A fluid pumping apparatus as defined in claim 1 wherein said first and second mechanical linkage means each include at least one resilient element for storing and returning kinetic energy of said movable pistons at opposite ends of travel thereof.

12. A fluid pumping apparatus as defined in claim 1 including releasable detent means for releasably locking said valve means at said first and second conditions.

13. A fluid pumping system comprising, cylinder housing means having first and second axially aligned cylinders formed therein, said cylinders having opposite closed inner and outer end wall means, first and second pistons axially movable in said respective first and second cylinders between inner and outer ends thereof, a piston rod extending through said inner end wall means and interconnecting the pistons for simultaneous movement thereof, valve housing means integral with said cylinder housing means and extending parallel therewith, a plurality of interconnected valve means inside said valve housing means for admission and discharge of fluid from opposite ends of said first and second cylinders, said valve means being simultaneously operable between said first and second conditions, first and second mechanical linkage means engagable with said first and second pistons, respectively, and mechanically coupled to said interconnected movable valve means for simultaneously moving said valve means from said first condition to said second condition upon movement of said first piston from the inner to the outer end of the first cylinder, and for simultaneously moving said valve means from said second condition to said first condition upon movement of said second piston from the inner to the outer end of the second cylinder, and first and second end cover means at the outer ends of said cylinders and valve housing means for substantially preventing external leakage of fluid which may leak from opposite ends of said valve housing means or from the outer end wall mean of said first and second cylinders past said mechanical linkage means.

14. A fluid pumping system as defined in claim 13 wherein said valve means are rotatably mounted for rotation between said first and second conditions, and said first and second linkage means include means for converting axial movement of said pistons to rotary motion of said interconnecting means.

15. A fluid pumping system as defined in claim 14 wherein said means for converting axial movement to rotary motion includes interengaged threads on said interconnected movable valve means and said first and second linkage means.

16. A fluid pumping system as defined in claim 14 wherein said first and second linkage means each include a resilient rocker arm for storing and returning kinetic energy of said movable pistons at opposite ends of piston travel.

17. A fluid pumping system as defined in claim 13 wherein said valve means comprise a slide valve reciprocably movable between said first and second conditions.

18. A fluid pumping system as defined in claim 17 wherein said first and second linkage means each include a resilient rocker arm for storing and returning kinetic energy of said movable pistons at opposite ends of piston travel.

19. A fluid pumping system as defined in claim 13 wherein said first and second mechanical linkage means comprise first and second push rods, respectively, extending through apertures in said outer end wall means in fluid tight engagement therewith, and first and second rocker arms within said end cover means, one end of which rocker arms engages said first and second push rods, respectively, and means for connecting the other end of the rocker arms to the interconnected valve means.

20. A fluid pumping system as defined in claim 19 wherein said means for connecting the other end of the rocker arms to the interconnected valve means comprise a rotatable valve actuating rod threaded at opposite ends, first and second non-rotatable, axially movable, blocks in engagement with said respective first and second rocker arms and threadedly engaging said threaded valve actuating rod for rotation of said valve actuating rod in one rotary direction upon axial movement of said first block by said first rocker arm and for rotation of said valve actuating rod in the opposite rotary direction upon axial movement of said second block by said second rocker arm.

* * * * *